3,175,011
PREPARATION OF 1-NITROSOALKYL DIMERS
Kaye L. Motz and Allan J. Lundeen, Ponca City, Okla., assignors to Continental Oil Company, Ponca City, Okla., a corporation of Delaware
No Drawing. Filed Oct. 19, 1962, Ser. No. 231,854
19 Claims. (Cl. 260—647)

This invention relates to the preparation of 1-nitrosoalkyl dimers. More particularly, the present invention relates to a novel method of preparing 1-nitrosoalkyl dimers by reacting an alkyl nitrite with an alkylaluminum compound.

1-nitrosoalkyl dimers are organic compounds having value as intermediates used in the synthesis of primary aliphatic amines, the latter compounds being derived by reduction of the dimers. Dimers of this type have previously been prepared by reacting nitric oxide with suitable hydrocarbon types during exposure of the reaction mixture to irradiation by ultraviolet light. They have also been synthesized by reacting nitrosyl chloride with a Grignard reagent. Grignard reagents are, of course, rather expensive compounds and have remained primarily laboratory reagents on this account so that large scale or commercial production of the dimers by this method is not practical.

The present invention provides a novel process for quickly, and relatively inexpensively, preparing 1-nitrosoalkyl dimers in moderate, to relatively good, yields. The process of the invention broadly comprises reacting a compound having the generic structural formula R—ONO, where R is an alkyl radical, e.g., a primary, secondary or tertiary alkyl radical, with an alkylaluminum compound having the generic structural formula $AlR_1R_2R_3$ where $R_1$, $R_2$ and $R_3$ are alkyl radicals, each of which contains at least three carbon atoms and which may be identical or different alkyl radicals. The reaction may be represented by the following equation in which it is assumed that $R_1$, $R_2$ and $R_3$ are identical alkyl radicals, represented simply by the symbol R':

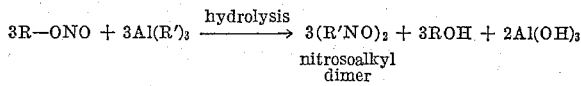

In addition to those products which are shown as yielded by the reaction, several by-products, the principle of which are an alkanal and an alkanaldoxime, are also yielded. It will, of course, be apparent that when the $R_1$, $R_2$ and $R_3$ alkyl substituents of the aluminum atom are of different, rather than identical molecular structure, a mixture of the dimers will be produced. The mixture comprises $(R_1NO)_2$, $(R_2NO)_2$, $(R_3NO)_2$, $R_1NO-ONR_2$,

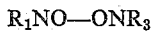

$R_2NO-ONR_3$, and mixtures thereof.

From the foregoing general discussion of the process of the present invention, it will have become apparent that a major object of the invention is to provide a new method of synthesizing a variety of nitrosoalkyl dimers.

A more specific object of the invention is to provide a rapid, relatively simple and economical process for producing nitrosoalkyl dimers. Other objects and advantages of the invention will become apparent as the following detailed description of the invention is read.

The reactants which are utilized in the process of the invention have been broadly described in the foregoing discussion. Considering now these reactants more specifically, the primary, secondary and tertiary alkyl nitrite (—ONO) compounds which are employed can vary considerably in their molecular makeup within the broad limits defined by the generic formula set forth above. The compound can be a normal paraffinic, primary alkyl nitrite, such as ethyl nitrite, a branched chain, primary alkyl nitrite such as 2-methylpropyl nitrite, a secondary alkyl nitrite such as iso-propyl nitrite, and a tertiary alkyl nitrite, such as tertiary butyl nitrite.

Of the general types of nitrites described above as being suitable for use in the process of the invention, we prefer, for economic reasons, to employ nitrites which are produced from the more readily available, lower molecular weight alcohols ($C_1$-$C_5$ alcohols), and thus, the preferred nitrites for use in the process are primary, secondary and tertiary alkyl nitrites in which the alkyl radicals contain from one to five carbon atoms. Excellent results have been obtained utilizing isopropyl nitrite, which constitutes the most preferred nitrite for use in the invention.

Theoretically, there is no known limitation concerning the number of carbon atoms in the alkyl groups of the nitrite. However, from the standpoint of availability and economy, alkyl nitrites containing 22 carbon atoms or less will normally be employed.

The alkylaluminum compound which is reacted with the alkyl nitrite can also be varied considerably in its molecular constitution. As in the case of the alkyl nitrite reactant, there is, in theory, no upper limit of the number of carbon atoms which may be contained in the alkyl substituents of the aluminum. It is preferred, however, that the alkyl substituents of the aluminum atom be of the normal or straight chain type, and contain 30 carbon atoms or less. This preferred maximum number of carbon atoms will, nevertheless, be subject to substantial variation, depending, for example, upon the length of each of the alkyl chains, the degree of branching of the chains, the particular dimer products sought, and the type of solvent which is utilized in the reaction in the manner described below. From the standpoint of product utility, the use of alkylaluminum compounds in which the alkyl groups are the same and contain at least three carbon atoms and preferably at least six carbon atoms are preferred.

Examples of reaction systems which can be employed include a straight chain primary alkyl nitrite such as n-butyl nitrite and trioctylaluminum, n-propyl nitrite and tripentylaluminum, ethyl nitrite and trinonylaluminum, n-propyl nitrite and tridodecylaluminum, n-butyl nitrite and tritetracontylaluminum, n-pentyl nitrite and trioctacosylaluminum, n-octyl nitrite and tripropylaluminum, n-dodecyl nitrite and diheptacosylhentriacontylaluminum, n-hexadecyl nitrite and diethylbutylaluminum, n-octadecyl nitrite and nonatriacontyldotetracontyltetratetracontylaluminum, a branched chain, primary alkyl nitrite such as 2-methylpropyl nitrite and tri-n-decylaluminum, 3-ethylbutyl nitrite and tridocosylaluminum, 2,3-dimethylbutyl nitrite and 2-methyl-3-butylhexyl-n-octyl-n-nonylaluminum, 4-ethyl-5-methylnonyl nitrite and n-nonyl-2-methyldodecylhexylaluminum, 6-pentyl-4-hexyldodecyl nitrite and trihenpentacontylaluminum, a secondary alkyl nitrite such as iso-propyl nitrite and triheptylaluminum, sec-butyl nitrite and trihexadecylaluminum, iso-propyl nitrite and trieicosylaluminum, sec-butyl nitrite and tri(isobutyl)-aluminum, sec-pentyl nitrite and 8-butyl-16-octyl-octatetracontyl - n - nonatetracontyl-octacosylaluminum, a tertiary alkyl nitrite, such as tertiary butyl nitrite and tridecylaluminum tertiary butyl nitrite and n-hexadecylpentyloctylaluminum and n-propyl nitrite and trihexylaluminum.

In carrying out the reaction of the invention, stoichiometric quantities of each of the reactants are each first dissolved in a cyclic ether complexing solvent. In the 1-nitroso-alkyl dimer producing reaction of the invention, this solvent not only functions to the usual end of permitting heat dissipation and reaction control, but also to effect the dissociation of the alkylaluminum dimer which normally forms due to the electrophylic nature of the monomeric alkylaluminum compound. Dissociation of the alkylaluminum compound to the monomeric form is important because the availability of the much more reactive monomer is essential to the progression of the reaction to yield the nitroso dimer. Dioxane, trioxane, tetrahydrofuran, tetramethylene oxide, 1,3-dioxolane, and tetrahydropyran are among the cyclic ether complexing solvents found suitable.

After each of the reactants has been dissolved in a sufficient quantity of complexing solvent to effect complete solution and to afford the necessary or desired heat dissipation, the two reactant solutions are mixed with each other at a reaction temperature of from about 0° C. to about —70° C. Since substantially lower yields are obtained at the higher temperatures within this broad range, we prefer to conduct the reaction at temperatures of from about —50° C. to about —70° C.

We do not wish to be limited to a specific time of contact (or reaction) of the reactants since product yield is obtained even when the period of contact is greatly extended. We have observed, however, that a contact or reaction time of about five minutes appears to produce the optimum yield of product. Usually, if the reactants are poured together slowly, the next step of the process, introduction of a hydrolyzing agent to the reaction mixture, may be taken as soon as the total addition of both reactants to the mixture is completed.

The exact function of the hydrolyzing agent which is preferably next added to the reaction mixture is not certain. It is possible that an aluminum salt of a nitroso compound is formed and is hydrolyzed by the hydrolyzing agent. The hydrolyzing agent may simply function to hydrolyze the excess of the alkylaluminum compound when such excess is present. We do know, however, that recovery of the nitroso dimer from the reaction mixture is extremely difficult when the hydrolysis step is omitted, even though the reaction is not totally unproductive of product when such step is omitted. The type of hydrolyzing agent utilized is not critical, with acids, such as hydrochloric acid and sulfuric acid, bases such as sodium hydroxide and potassium hydroxide, and water all being suitable for use. Instead of hydrolysis, alcoholysis may be used with such readily available alcohols as ethyl alcohol, methyl alcohol and isopropyl alcohol being employed. The practice of the hydrolysis or alcoholysis step will be understood by those skilled in the art, and the term "hydrolysis" when used in the appended claims is to be understood as encompassing both procedures.

Following hydrolysis, the solid product is filtered from the reaction mixture, and may then be purified by washing, air drying and recrystallizing from a suitable solvent if desired.

To provide further explanation of the manner in which this invention is practiced, the following is an example of the use of the process to produce 1-nitrosodecane dimer:

Into a 250 ml. 3-necked flask containing 50 ml. of dry tetrahydrofuran under nitrogen at —50° C. was dropped simultaneously 7.5 grams (0.05 equivalent) of tri-n-decylaluminum in 50 ml. of tetrahydrofuran and 4.5 grams (0.05 equivalent) of isopropyl nitrite in 50 ml. of tetrahydrofuran. As soon as the addition of the reactants to the flask was completed, the reaction mixture was hydrolyzed by adding to the mixture 100 ml. of 10% hydrochloric acid. The solid dimer product was then filtered from the reaction mixture, washed with water and dried in air. The dimer was then recrystallized from hot hexane. 4.1 grams of the 1-nitrosodecane dimer was obtained, representing a yield of approximately 50% of theory.

From the foregoing discussion, it will be apparent that a new process for preparing 1-nitrosoalkyl dimers is presented by the present invention. Certain modifications in process conditions and reactant types will be suggested by the above discussion to those skilled in the art. However, in so far as the broad principles which underlie the process as they are hereinbefore described continue to afford the basis for the practice of the described process by others, such modifications are deemed to be included within the spirit and scope of the present invention except as the same shall be necessarily limited by the appended claims.

We claim:

1. The method of preparing 1-nitrosoalkyl dimers which comprises:

reacting at a temperature of from about 0° C. to about —70° C. in a cyclic ether complexing solvent reaction medium, an alkyl nitrite compound having the structural formula R—ONO, where R is an alkyl radical with an alkylaluminum compound having the structural formula $AlR_1R_2R_3$, where $R_1$, $R_2$ and $R_3$ are each alkyl radicals containing at least three carbon atoms; and recovering dimer product having a structural formula selected from the group consisting of $(R_1NO)_2$, $(R_2NO)_2$, $(R_3NO)_2$, $R_1NO—ONR_2$, $R_1NO—ONR_3$, $R_2NO—ONR_3$, and mixtures thereof.

2. The method claimed in claim 1 wherein the alkyl radicals in said alkylaluminum compound are identical.

3. The method claimed in claim 1 wherein the alkyl radicals in said alkylaluminum compound each contain from three to thirty carbon atoms.

4. The method claimed in claim 1 wherein the alkyl radicals in said alkylaluminum compound each contain at least six carbon atoms.

5. The method claimed in claim 4 wherein the alkyl radicals in said alkylaluminum compound each contain from six to thirty carbon atoms.

6. The method claimed in claim 1 wherein said alkyl radical in said alkyl nitrite compound is a secondary alkyl radical containing from one to five carbon atoms.

7. The method claimed in claim 6 wherein said alkyl nitrite is isopropyl nitrite.

8. The method claimed in claim 7 wherein said alkylaluminum compound is tri-n-decylaluminum.

9. The method of preparing a 1-nitrosoalkyl dimer which comprises:

(a) reacting at a temperature of from about 0° C. to about —70° C. in a cyclic ether complexing solvent, (I) an alkyl nitrite compound having the structural formula R—ONO, where R is an alkyl radical with (II) an alkylaluminum compound having the structural formula $AlR_1R_2R_3$, where $R_1$, $R_2$ and $R_3$ are each alkyl radicals containing at least three carbon atoms;

(b) adding a hydrolyzing agent to the mixture produced in step (a); and (c) recovering dimer product having a structural formula selected from the group consisting of $(R_1NO)_2$, $(R_2NO)_2$, $(R_3NO)_2$, $R_1NO—ONR_2$, $R_1NO—ONR_3$, $R_2NO—ONR_3$, and mixtures thereof.

10. The method claimed in claim 9 wherein said cyclic ether is selected from the group consisting of tetrahydrofuran, tetrahydropyran, dioxane and trioxane.

11. The method claimed in claim 10 wherein the alkyl radicals in said alkylaluminum compound are identical and contain from six to thirty carbon atoms.

12. The method claimed in claim 11 wherein said alkylaluminum is tri-n-decylaluminum.

13. The method claimed in claim 9 wherein said compounds are reacted in said cyclic ether complexing solvent at a temperature of between —50° C. and —70° C.

14. The method of preparing a 1-nitrosoalkyl dimer having a structural formula selected from the group consisting of $(R_1NO)_2$, $(R_2NO)_2$, $(R_3NO)_2$, $R_1NO—ONR_2$, $R_1NO—ONR_3$, $R_2NO—ONR_3$, and mixtures thereof which comprises reacting at a temperature of between 0° C. and —70° C., cyclic ether complexing solvent solution of (I) an alkyl nitrite compound having the structural formula R—ONO, where R is an alkyl radical, and
(II) an alkylaluminum compound having the structural formula $AlR_1R_2R_3$, where $R_1$, $R_2$ and $R_3$ are each alkyl radicals containing at least three carbon atoms.

15. The method claimed in claim 14 wherein said alkyl nitrite compound is isopropyl nitrite and said alkylaluminum compound is tri-n-decylaluminum.

16. The method claimed in claim 15 and further characterized to include the step of adding a hydrolyzing agent to the mixture produced by reacting said solutions.

17. The method claimed in claim 16 wherein said solutions are reacted at a temperature of between −50° C. and −70° C.

18. The method claimed in claim 14 wherein said complexing solvent is selected from the group consisting of tetrahydrofuran, tetrahydropyran, dioxane and trioxane.

19. The method claimed in claim 15 and further characterized to include the steps of:
(a) adding a hydrolyzing agent to the mixture produced by reacting said solutions;
(b) filtering said mixture after addition of the hydrolyzing agent to recover said dimer from the mixture; and
(c) further purifying said dimer by recrystallization.

No references cited.